May 31, 1932.　　　J. L. BENNETT　　　1,860,799
UTENSIL FOR POPPING CORN AND THE LIKE
Filed March 8, 1929　　　2 Sheets-Sheet 1
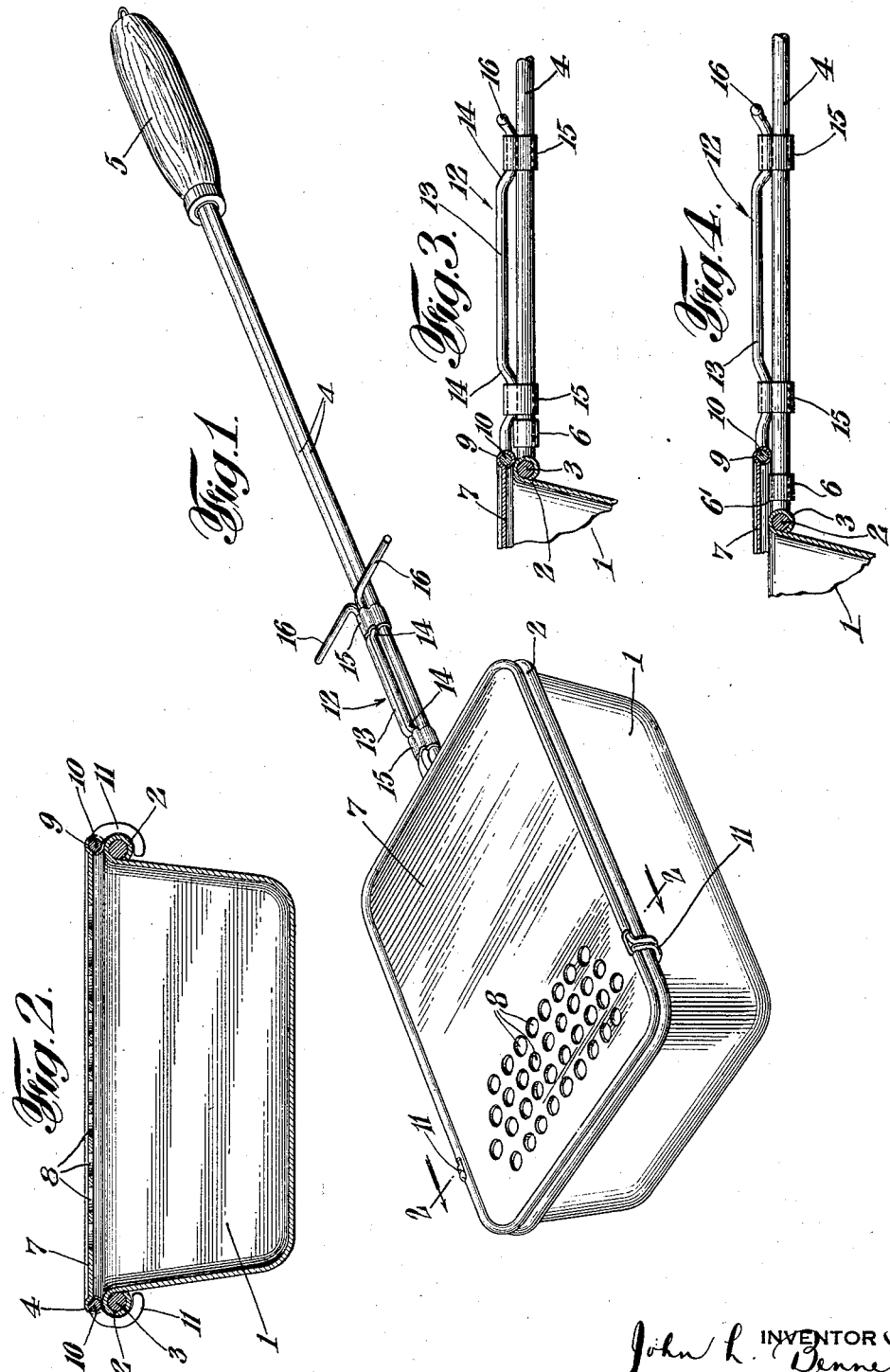
INVENTOR
John L. Bennett
BY
Pundle, Wright, Neal & Bean
ATTORNEYS May 31, 1932.  J. L. BENNETT  1,860,799
UTENSIL FOR POPPING CORN AND THE LIKE
Filed March 8, 1929  2 Sheets-Sheet 2
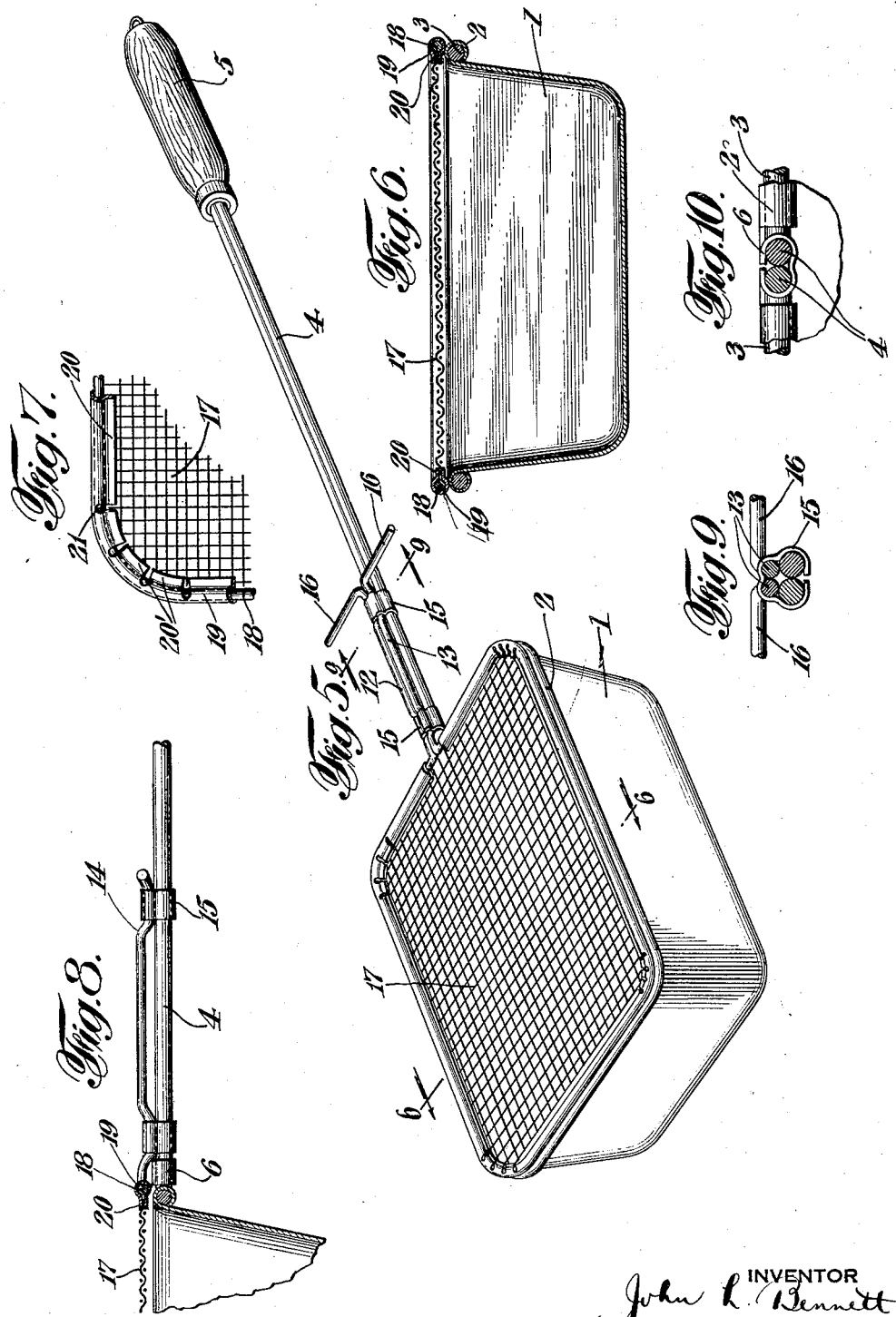
INVENTOR
John L. Bennett
BY
Prindle, Wright, Neal & Bean
ATTORNEYS Patented May 31, 1932

1,860,799

UNITED STATES PATENT OFFICE

JOHN L. BENNETT, OF DECATUR, ILLINOIS, ASSIGNOR TO U. S. MANUFACTURING CORPORATION, OF DECATUR, ILLINOIS, A CORPORATION OF ILLINOIS

UTENSIL FOR POPPING CORN AND THE LIKE

Application filed March 8, 1929. Serial No. 345,333.

This invention relates to improvements in utensils which may be used for corn popping, frying and other similar purposes and the principal objects thereof reside in improvements in details of construction whereby a device of this kind may be manufactured and produced commercially on an extensive scale at a minimum expense and sold to the public cheaply. The device is neat and attractive in appearance, strong in construction, of large capacity and has a long and extended life. The cover is slidably mounted with reference to the body of the device and frictionally held in various adjusted positions.

A feature of this invention is the provision of a basket or body of solid metal construction so that seasoning and flavoring substances or frying substances may be used without leaking or spilling over and then the device readily cleaned.

This invention is an improvement upon the invention disclosed and claimed in my co-pending application Serial No. 274,184 filed May 1, 1928.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, several embodiments of my invention, it being expressly understood, however, that various changes may be made in practice within the scope of the claims without digressing from my inventive idea.

In the drawings—

Figure 1 represents a perspective view of one form of device constructed to embody my invention, the lid or cover being shown in closed position.

Figure 2 is a vertical cross section taken substantially on line 2—2 of Figure 1.

Figure 3 is a detail view of the cooperating handle members showing the parts in closed position.

Figure 4 is a similar view showing the parts in partially open position.

Figure 5 is a perspective view of a device constructed to embody my invention, in which the lid or cover is formed of wire netting or other similar material.

Figure 6 is a vertical cross section taken on line 6—6 of Figure 5.

Figure 7 is a detail view of the corner construction of the lid or cover.

Figure 8 is a detail view of the cooperating handle members showing the lid or cover in closed position.

Figure 9 is a vertical cross section through the two handle members taken on line 9—9 of Figure 5 and Figure 10 is a cross section through the main handle member illustrating the connection with the body or basket of the device.

Referring now to the drawings, the numeral 1 designates the body of the device which forms the receptacle for the material used. This body is formed of a suitable metal stamped or pressed into suitable shape. One shape is illustrated in the drawings being generally rectangular, having sides which flare slightly and with rounded corners so as to facilitate cleaning. The top edge of the body 1 is turned or bent over as at 2 to form a bead and to clamp the wire loop 3, which, of course, corresponds in shape to the rectangular upper edge of the body. This wire loop 3 is preferably formed as part of the main handle member which extends therefrom in the form of two parallel wires or rods 4, having a suitable gripping element 5 attached thereto at the free ends. These two parts 4 of the handle are held in close position by means of a suitable clamp member 6 located adjacent the beginning of the loop. The two parts of the handle may also be welded or soldered or otherwise secured together.

A lid or cover member is provided for the body and this in the form shown in Figures 1 to 4 inclusive is of solid metallic construction, as indicated at 7, but is provided with a plurality of openings or apertures 8 near one end to permit the shaking out of the unpopped corn and other small articles. This lid or cover 7 is provided with a beaded edge 9 receiving the wire loop 10. This loop, of course, is also rectangular to conform to the general shape of the lid or cover and the top of the body of the device. At certain intervals portions of this wire loop 10 are bent outwardly to form loops 11. These loops are bent or curved so as to extend around the outside of and under the beaded edge 2 of the body, operating as guiding members to guide the lid or cover in its movements across the top edge of the body. The shape of these loops 11 is such as to frictionally engage the beaded parts 2 but also to permit free sliding movement of the lid or cover.

The rectangular loop 10 of the lid or cover is extended to form handle member 12 composed of a pair of parallel and closely associated wires or rods 13. These wires or rods are much shorter than the wires or rods 4 of the main handle and are positioned on top thereof and are slidably and frictionally held in that position. This is accomplished by forming the bends or depressions 14 in the wires or rods 13 and affixing the clamping members or loops 15 around the wires or rods 4 of the main handle and around the wires or rod 13 of the handle for the lid or cover, these clamping loop members 15 being positioned in said bends or identations 14 and being clamped with sufficient force to cause a noticeable frictional engagement between the two handle members but still permit sliding movement therebetween. It is to be noted that the wires or rods forming the handle member for the lid or cover are of a smaller gauge than the wires or rods forming the handle member of the body, and that the clamping member 6 is positioned adjacent the top edge of the body and forms a stop or abutment for one of the clamping loop members 15. It is also to be noted, referring particularly to Figures 3 and 4, that the handle member 12 is so bent that the edge of the lid or cover 7 has a frictional engagement with the main handle members and with the clamping loop member 6. Therefore, the lid or cover is always tight upon the body when in closed position. The ends of the wires or rods 13 may be bent laterally, as indicated at 16, to form manipulating means.

In the device shown in Figures 5 to 8 inclusive the lid or cover is formed of wire netting or similar material 17 and formed of a shape to fit the top of the body and having a rectangular wire loop 18 secured at its edge by means of the metallic bead member 19, which is clamped around wire loop member 18 and the edges of the wire netting. This metallic bead member is of sufficient width so as to have a portion 20 extend a substantial distance in engagement with the wire netting as at 20′. The corners of this metallic bead member are cut or otherwise slotted as at 21 so as to facilitate the bending of this member at the corners and afford a nice and close fit without the necessity of overlapping or folding of the metal. The remainder of this construction is substantially the same as described in connection with the other form of device, as clearly seen from the drawings.

Attention is directed to the fact that the metal receptacle or body is preferably drawn in one piece and is, therefore, seamless, with no folds, gaps or rivets, or sharp corners to collect and hold grease or dirt. Furthermore, the main handle construction 4 is substantial and strong so as to be fully capable of supporting the body or receptacle with its contents and, of course, the handle for the lid or cover does not have to be so strong or heavy.

It is to be noted that in moving from open and closed position the edge of the lid or cover frictionally engages the handle member 4 on both sides of the clamping loop member 6. As before explained, this is due to the fact that the wire handle member 12 is bent near its junction with the loop 10 so that this loop is normally depressed and forced against the top edge of the receptacle and the handle member 4. Therefore, as clearly illustrated in Figures 3 and 4, the beaded edge 9 of the lid or cover bears against the top of the clamping loop 6 in its movement to and from open and closed positions, and when the lid or cover is closed the edge of the bead 9 engages the foremost shoulder 6′ of the clamping loop member 6 to prevent the accidental withdrawal of the lid or cover from its closed position.

What I claim is:—

1. A device of the character described including, in combination, a basket or receptacle having a handle member extending therefrom, a lid or cover for said basket or receptacle comprising a wire loop with a handle member extending therefrom and wire netting within the loop, a metallic binding and bead member clamped around said loop clamping both sides of said wire netting at its edges so as to assemble the lid or cover member, said handle members each being composed of a pair of wire members extending in close relation to each other and means for holding said handle members in associated relation to permit sliding movement thereof relative to each other for opening and closing the lid or cover.

2. A device of the character described, including in combination, a receptacle formed of one piece drawn from a metal blank with rounded edges and rounded corners within and without and having a handle member extending therefrom, a lid or cover for said basket or receptacle, and having a second handle member extending therefrom, means for holding the handle members in slidable frictional engagement, and means on the first mentioned handle to prevent accidental opening of the lid or cover.

3. A device of the character described including, in combination, a body or receptacle formed of one piece drawn from a metal blank with rounded edges and rounded corners within and without, said body or receptacle being provided with an extended handle member, a lid or cover for said body or receptacle and having a second handle member extending therefrom, said handle members being closely associated together and having means for holding them in slidable frictional engagement, the second handle member being bent near its junction with the lid or cover so as to cause said lid or cover to tightly fit against the upper edge of the receptacle.

4. A device of the character described including, in combination, a basket or receptacle having a handle member extending therefrom, a lid or cover for said basket or receptacle comprising a wire loop with a handle member extending therefrom and wire netting within the loop, a metallic binding and bead member clamped around said loop and having extended edges which frictionally engage the edges of said wire netting so as to assemble the lid or cover, said handle members each being composed of a pair of wire members extending in close relation to each other, and means for holding said handle members in associated relation to permit sliding movement thereof relative to each other for opening and closing the lid or cover.

In testimony that I claim the foregoing, I have hereunto set my hand this 4th day of March, 1929.

JOHN L. BENNETT.